United States Patent

Pirson et al.

[11] Patent Number: 5,953,458
[45] Date of Patent: Sep. 14, 1999

[54] METHOD AND DEVICE FOR MOTION ESTIMATION

[75] Inventors: Alain Pirson, Moirans; Pierre-Xavier Thomas, Grenoble, both of France

[73] Assignee: Thomson multimedia S.A., Boulogne, Cedex, France

[21] Appl. No.: 08/758,113

[22] Filed: Nov. 25, 1996

[30] Foreign Application Priority Data

Dec. 6, 1995 [DE] Germany ............................ 95 14 433

[51] Int. Cl.$^6$ ..................................................... G06K 9/36
[52] U.S. Cl. ............................................................. 382/236
[58] Field of Search ..................................... 382/232, 236, 382/248, 250; 358/432, 433; 348/384, 394, 395, 400–404, 407–416, 420, 421, 425, 430, 431

[56] References Cited

U.S. PATENT DOCUMENTS

| 5,226,093 | 7/1993 | Iwase ....................................... 382/236 |
| 5,467,413 | 11/1995 | Barrett ..................................... 382/236 |
| 5,535,288 | 7/1996 | Chen et al. ............................... 382/236 |
| 5,594,813 | 1/1997 | Fandriano et al. ...................... 382/236 |
| 5,636,293 | 6/1997 | Lin et al. .................................. 382/236 |
| 5,745,605 | 4/1998 | Bard et al. ................................ 382/236 |

OTHER PUBLICATIONS

Microprocessors And Microsystems, vol. 17, No. 7,. Sep. 1993 London, GB, pp. 425–434, Amanda Richarson et al. "Sti 3220 motion estimation processor".

Proceedings of the International Conference on Acoustics, Speech, and Signal Processing, May 9–12, 1995, Detroit, US, IEEE, New York, pp. 3283–3286, Alain Pirson et al. "A programmable motion estimation processor for full search block matching".

Proceedings of the 1995 International Conference on Acoustics, Speech and Signal Processing, May 9–12, 1995, Detroit (US) IEEE, New York, pp. 3299–3302, Mei–Cheng Lu et al. "Semi–systolic array based motion estimation processor design".

Primary Examiner—Jose L. Couso
Attorney, Agent, or Firm—Joseph S. Tripoli; Ronald H. Kurdyla; Alexander J. Burke

[57] ABSTRACT

The invention relates to a device for blockwise estimation of motion. This device includes on the one hand a matrix array (300) for calculating an error function, the said array including storage elements (S, 406, 407) for plural blocks (a, a') of current pixels and means (403) for switching between the storage elements corresponding to the various blocks and on the other hand a memory (801) for feeding the said array with pixels of a search window, linked to the said array.

The device according to the invention is characterized in that
  the said memory (801) is a random access memory,
  the said memory contains a band of the search window corresponding to the entirety of the current blocks stored in the array (300),
  the said device including means (812) for read-addressing partial sections of the said band of the memory as a function of the block processed (a, a') by the said array, the said sections being introduced column by column into the said array.

The invention also relates to a corresponding method and applies especially in the field of digital television.

FIG. 7.

6 Claims, 8 Drawing Sheets

| 1/3 | 2/4 |
|---|---|

| 5/7 | 6/8 |
|---|---|

| 9/11 | 10/12 |
|---|---|

| 13/15 | 14/16 |
|---|---|

FIG. 6f

| 1/2 | 3/4 |
|---|---|

| 5/6 | 7/8 |
|---|---|

| 9/10 | 11/12 |
|---|---|

| 13/14 | 15/16 |
|---|---|

METHOD AND DEVICE FOR MOTION ESTIMATION

The subject of the invention is a method of clockwise estimation of motion in a system comprising a lines of b arrays for calculating an error function between current blocks and blocks of a search window, each array having means of storage in parallel of x blocks for which the evaluation of the error function is performed respectively during x passes. The subject of the invention is also a device for implementing this method.

The invention applies in the field of image compression and standards conversion.

This patent application is filed jointly with a patent application relating to the serializing of the arrays described below and entitled "Method of processing data in matrix arrays in a motion estimation system".

There are numerous image compression systems based on blockwise processing of pixels. One means of reducing the temporal redundancy between images is to employ motion estimation, a method consisting in determining block by block of an image to be compressed, those blocks which are the most alike in a previous or future image. The relationship between a current block and the most alike block of another image is defined by a motion vector. The coordinates of this vector correspond to the difference of coordinates of the two blocks.

Various processes for determining motion vectors are known, requiring greater or lesser numbers of calculations and yielding vectors of greater or lesser accuracy. One of these processes (termed "block matching") consists in systematically comparing the current block with all the blocks of like size of a search window of a previous image, this window being for example centred on the position, referred to the previous image, of the current block.

The comparison is carried out by calculating for each match the value of an error function. The motion vector will correspond to the smallest value of this function over the set of matches. Commonly used functions are the sum of the absolute values of the differences of the pixels between matched blocks, or alternatively the sum of the squares of the differences.

Motion estimation generally requires high calculational power which increases with the accuracy requested and with the permitted amplitude of the motion vectors. French Patent Application FR 94 10158 describes a motion estimation processor adapted to perform calculations at high bit rates. This document relates especially to arrays of elements for calculating the error function. An advantage of these arrays is that they are modular and can easily be serialized or parallelized and that they can each process two blocks in parallel.

The question arises of the organization of the current blocks in such arrays, with a view to improving the performance thereof.

The invention relates to a method of blockwise estimation of motion in a system comprising a lines of b arrays for calculating an error function between current blocks and blocks of a search window, each array having means of storage in parallel of x blocks for which the evaluation of the error function is performed respectively during x passes, the said method being characterized in that it comprises the steps:

of selecting a group of x*a*b blocks from a current image and of splitting this group into x vertical slices of a*b blocks, of storing each slice in the storage means corresponding to one and the same pass, of loading a band of the search window corresponding to the entirety of these blocks into a feed memory of the said arrays, during a pass, of read-addressing the said feed memory to the said arrays of the section of the band corresponding to the slice of blocks processed during this pass.

The bands of pixels of the search window are stored in a memory which will feed the calculation arrays. The stored bands contain pixels of the search windows of the entirety of the current blocks stored in the arrays.

According to the inventive method, in order to perform the calculations relating to one pass, only the sections of band corresponding to the block slice processed during this pass are read, it being unnecessary to read sections of bands linked solely with other passes.

Processing vertical slices of blocks makes it possible to reduce the width of the useful band to be read per pass from the corresponding memory. In this way, the number of calculation cycles per pass is thus reduced.

According to a particular embodiment, the chosen group of current blocks possesses the shape of a rectangle whose shape factor is chosen close to that of the search window corresponding to a block.

It has been found that this characteristic makes it possible to reduce the number of calculation cycles to be performed in order to process all the blocks.

The invention also relates to a device for blockwise estimation of motion including on the one hand a matrix array for calculating an error function, the said array including storage elements for plural blocks of current pixels and means for switching between the storage elements corresponding to the various blocks, on the other hand a memory for feeding the said array with pixels of a search window, linked to the said array, characterized in that the said memory is a random access memory, the said memory contains a band of the search window corresponding to the entirety of the current blocks stored in the array, the said device including means for read-addressing partial sections of the said band of the memory as a function of the block processed by the said array, the said sections being introduced column by column into the said array.

Other characteristics and advantages of the invention will emerge through the description of a particular non-limiting embodiment illustrated by the appended figures.

Figure 1:
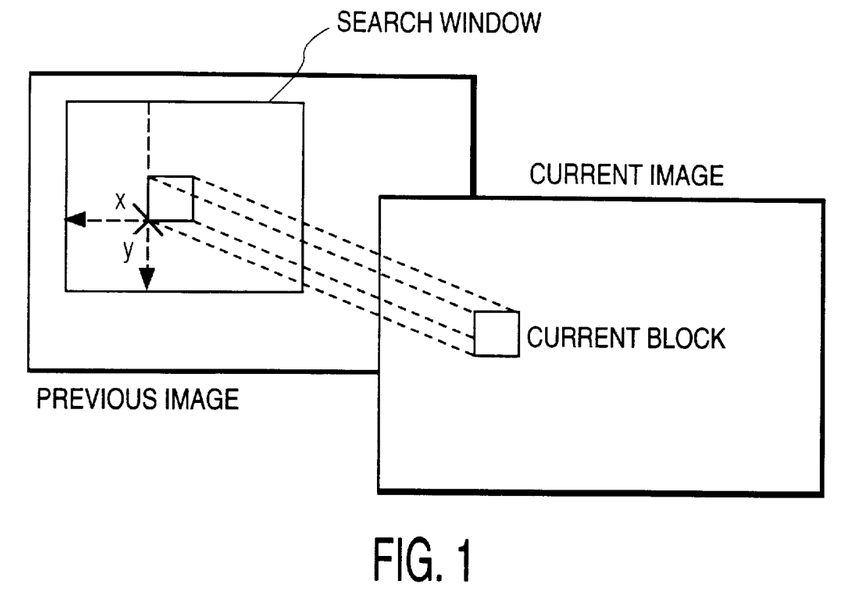
FIG. 1 represents a search window within an image in relation to the position of the current block.

In these figures,

FIG. 1 illustrates the position of the search window around the position referred to a previous image of a block of the current image whose motion is to be estimated.

Figure 2:
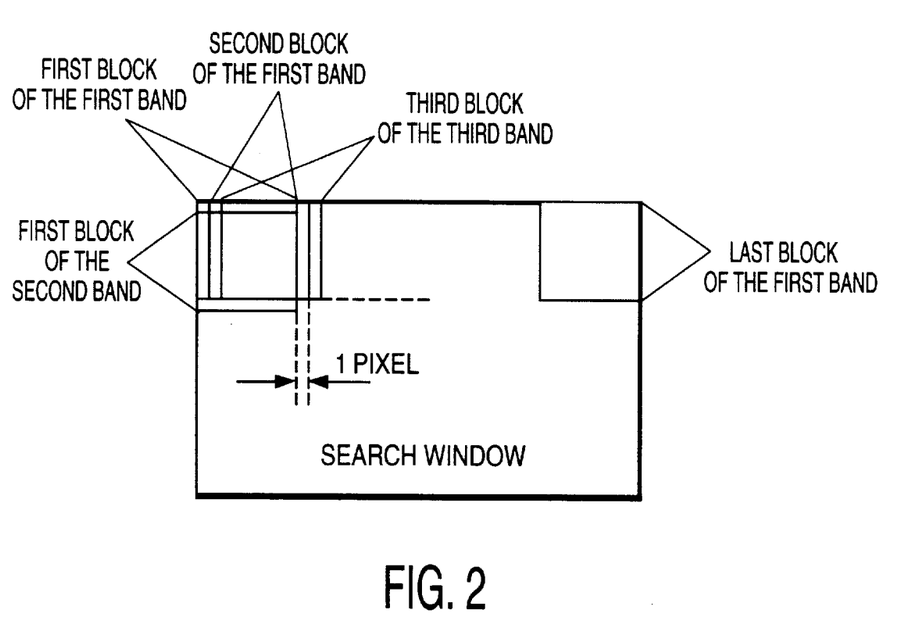
FIG. 2 represents the partitioning of a search window into bands of pixels and into blocks.

FIG. 2 illustrates the partitioning of a search window into bands within the framework of motion estimation.

When working with current blocks having a height of 4 pixels, the first band corresponds to the first four lines of the search window, whereas the second band corresponds to lines 2 to 5. It can be seen that between two successive bands only a single line of pixels differs.

If it is assumed that the size of a block is 4 pixels in height and 8 pixels in width, then a band of 28 columns and 4 lines contains 21 blocks of like size. Obviously, these blocks are not disjoint: two consecutive blocks differ only by a column of pixels. The calculation array will therefore have to deliver 21 values of the error function when processing this band, one for each possible block position in the band.

Co-pending application Ser. No. 08/511,483 filed on Aug. 4, 1995, and issued on Apr. 28, 1998, is concerned with related subject matter.

Figure 3:
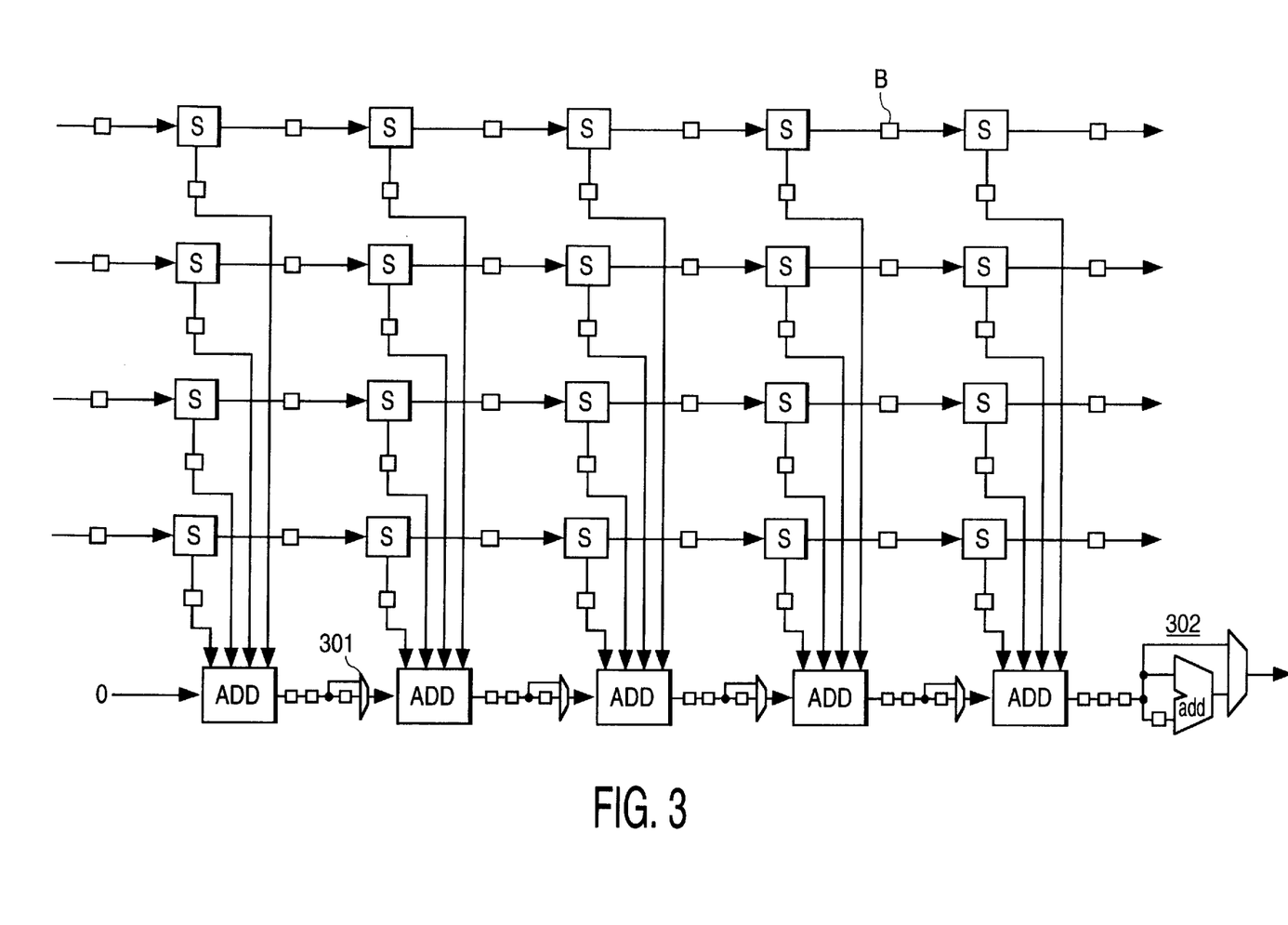
FIG. 3 represents a block diagram of an array for calculating error function values.

An array of calculation elements is illustrated by FIG. 3. This array includes lines of S cells linked in series by buffers B, an adder "Add" being associated with each column of S cells, an output of each S cell being linked to the adder of the corresponding column via a buffer B. The adders are themselves linked in series via three buffers in series one of which may be short-circuited by a bypass circuit 301. Lastly, the array includes a final bypass circuit 302.

The function of such an array is to calculate values of an error function between a block of pixels of an image to be compressed and blocks of like size of a past or future image, termed the reference image. The blocks of the reference image generally correspond to the blocks of a search window centred around the position, referred to this reference image, of the current block.

Figure 4:
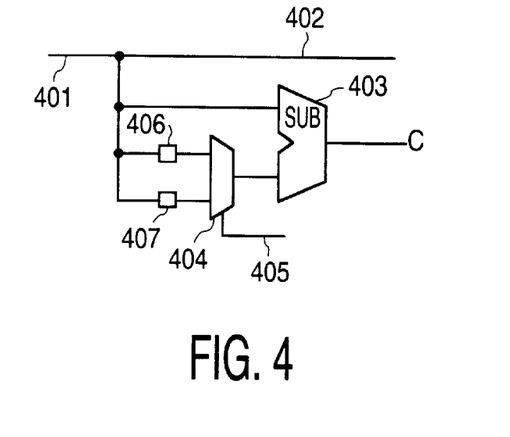
FIG. 4 represents a block diagram of an "S" element of the array of FIG. 3.

FIG. 4 is a functional schematic of a calculation cell S. This cell includes an input 401 linked directly to an output 402. This line corresponds to the values of pixels of the search window.

The cell also includes two buffers 406 and 407, in which are stored the values of pixels either of one and the same block, or of two different blocks. The output of these buffers is multiplexed by a multiplexer 404, controlled by a line 405, to an input of a subtractor/absolute value circuit 403 whose output C is directed to the buffer B (see FIG. 1) linking the cell S to its appointed adder. The other input of the circuit 403 is linked to the line connecting the input 401 and the output 402.

Whilst the pixels of the block of the current image are each stored in an S cell, the pixels of the search window are supplied to these S cells via the buffers B.

The search window is partitioned into bands 4 pixels high, these bands being inserted pixel column by pixel column into the array, thus propagating by one column at each calculation cycle.

It is initially assumed that a single current block is stored in the array, that is to say that one of the two buffers 206 and 207 of each S cell is not used.

Figure 5:
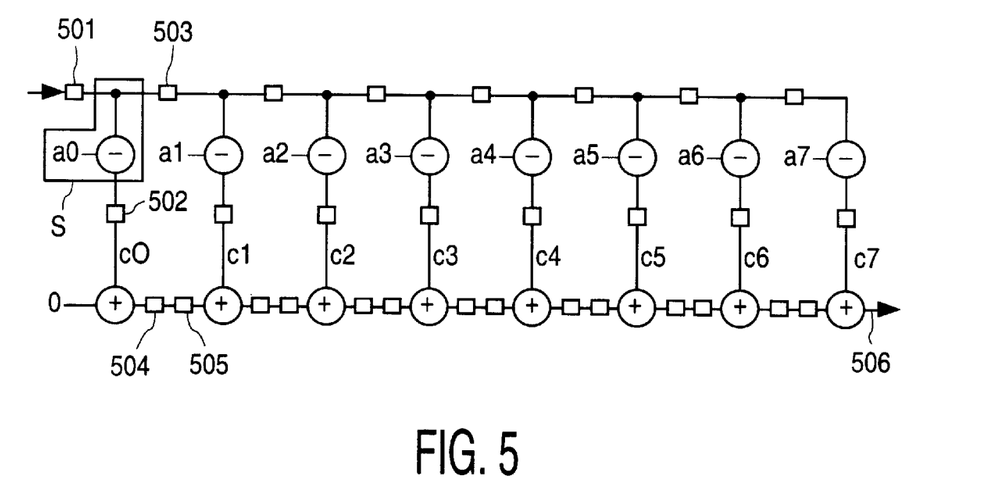
FIG. 5 represents a calculation array including one line of eight elements and intended to illustrate the operation of the array.

FIG. 5 illustrates an array of calculation elements of 8 columns and one line. This simple array will serve to clarify the mechanism of the calculations (the bypass circuit 301 is employed to short-circuit the third buffer between each pair of adders). The operation of a larger array is entirely similar.

The value of a pixel of the search window will be denoted bx and the value of a pixel of the current block will be denoted ax. The pixel values a are already stored in the array. A value b is presented to the input of the array at each cycle. Table 1 represents the course of the outputs C from each S cell at buffer level.

The characters in bold represent the results to be appended so as ultimately to obtain a value of the error function for the current block.

TABLE 1

| Cycle | C0 | C1 | C2 | C3 | C4 | C5 | C6 | C7 |
|---|---|---|---|---|---|---|---|---|
| 0 | — | — | — | — | — | — | — | — |
| 1 | \|b0-a0\| | — | — | — | — | — | — | — |
| 2 | \|b1-a0\| | \|b0-a1\| | — | — | — | — | — | — |
| 3 | \|b2-a0\| | \|b1-a1\| | \|b0-a2\| | — | — | — | — | — |
| 4 | \|b3-a0\| | \|b2-a1\| | \|b1-a2\| | \|b0-a3\| | — | — | — | — |
| 5 | \|b4-a0\| | \|b3-a1\| | \|b2-a2\| | \|b1-a3\| | \|b0-a4\| | — | — | — |
| 6 | \|b5-a0\| | \|b4-a1\| | \|b3-a2\| | \|b2-a3\| | \|b1-a4\| | \|b0-a5\| | — | — |
| 7 | \|b6-a0\| | \|b5-a1\| | \|b4-a2\| | \|b3-a3\| | \|b2-a4\| | \|b1-a5\| | \|b0-a6\| | — |
| 8 | \|b7-a0\| | \|b6-a1\| | \|b5-a2\| | \|b4-a3\| | \|b3-a4\| | \|b2-a5\| | \|b1-a6\| | \|b0-a7\| |
| 9 | \|b8-a0\| | \|b7-a1\| | \|b6-a2\| | \|b5-a3\| | \|b4-a4\| | \|b3-a5\| | \|b2-a6\| | \|b1-a7\| |
| 10 | \|b9-a0\| | \|b8-a1\| | \|b7-a2\| | \|b6-a3\| | \|b5-a4\| | \|b4-a5\| | \|b3-a6\| | \|b2-a7\| |
| 11 | \|b10-a0\| | \|b9-a1\| | \|b8-a2\| | \|b7-a3\| | \|b6-a4\| | \|b5-a5\| | \|b4-a6\| | \|b3-a7\| |
| 12 | \|b11-a0\| | \|b10-a1\| | \|b9-a2\| | \|b8-a3\| | \|b7-a4\| | \|b6-a5\| | \|b5-a6\| | \|b4-a7\| |
| 13 | \|b12-a0\| | \|b11-a1\| | \|b10-a2\| | \|b9-a3\| | \|b8-a4\| | \|b7-a5\| | \|b6-a6\| | \|b5-a7\| |
| 14 | \|b13-a0\| | \|b12-a1\| | \|b11-a2\| | \|b10-a3\| | \|b9-a4\| | \|b8-a5\| | \|b7-a6\| | \|b6-a7\| |
| 15 | \|b14-a0\| | \|b13-a1\| | \|b12-a2\| | \|b11-a3\| | \|b10-a4\| | \|b9-a5\| | \|b8-a6\| | \|b7-a7\| |

During cycle 0, the value b0 is stored in the first buffer B (reference 501) at the input of the array. It is only at cycle 1 that the result |b0-a0| delivered by the first S cell is stored in the buffer 502 at its output C0. During cycle 1, the value b0 is likewise stored by the second buffer B 503.

At a given moment in the operation of the array, the sum of all absolute values of the differences corresponding to a given position of the current block (in this instance a line of 8 pixels) in the reference window will have to be retrieved at the output of the last adder. The results which have to be appended at adder level to the first of these positions are indicated in bold in the table.

This accumulation function conditions the lag which must be introduced by the buffers 504 between the adders. It is easy to see that a lag of two cycles must be introduced in order for the propagation of the results at the adder level to occur properly. This explains the presence of two buffers between each adder.

At the end of the fifteenth cycle, the value of the error function for the first position of the current block is available at the output 506 of the array. This delay represents the time required for the band of pixels of the search window to propagate up to the end of the array. Subsequently, a new value of the error function is available at each cycle, until the last pixel b of the first band of the search window has propagated up to the end of the array. The second band will have already started to propagate, so that a priori there is no idle time between two successive bands: the last value of the error function corresponding to the first band is followed by the first value of the error function of the second band.

In the evaluations of the number of cycles required to calculate the results corresponding to a band, the unproductive cycles corresponding to the initial filling of the array will be neglected in what follows.

Consequently, if a band contains Sx different possible positions for a block, when a block possesses n columns of pixels, then the number of calculation cycles required to obtain the results is $$NCPP=Sx+n-1$$

More generally, if it is assumed that the array can contain more than two blocks in series (in this instance n), for example when two arrays such as that of FIG. 5 are placed in series, then if Nx denotes the number of blocks:

$$NCPP=Sx+n*Nx-1$$

Figure 8:
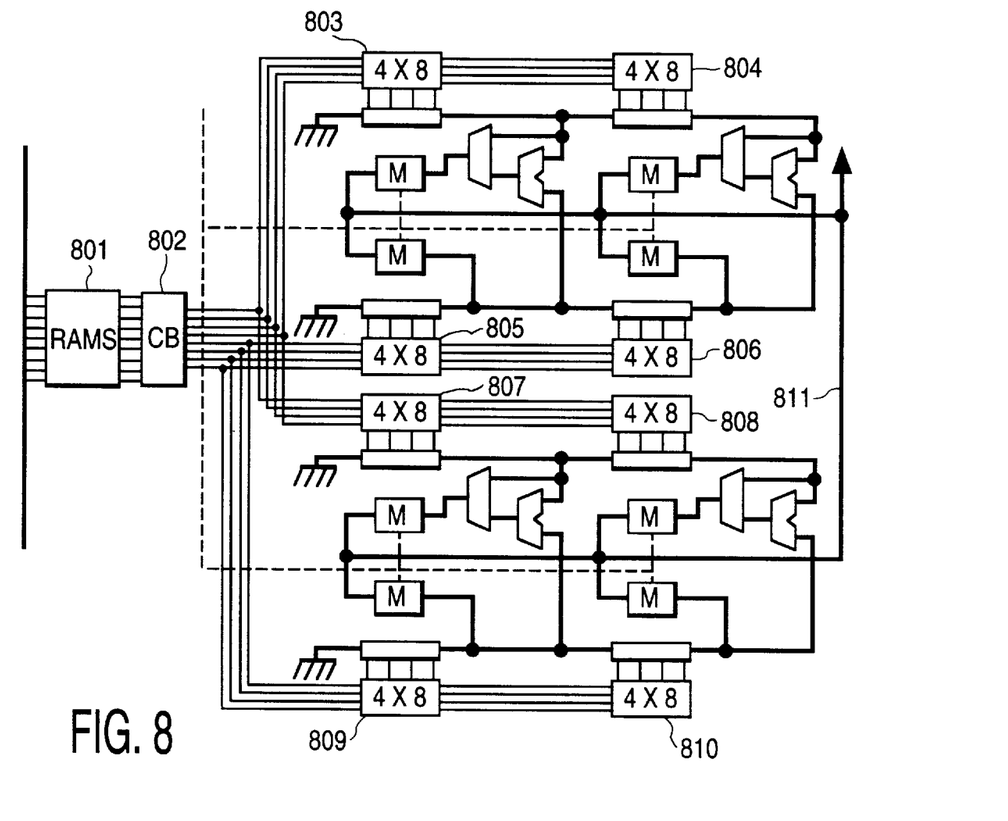
FIG. 8 represents the schematic of a circuit comprising eight arrays of four times eight pixels, organized as four lines of two arrays.

FIG. 8 illustrates the arrangement of eight arrays composed respectively of 4 lines of 8 calculation elements in a matrix of four lines of two arrays each. These arrays are fed by ten random-access line memories 801 via a switching circuit 802. At a given moment, only eight memories 801 are connected across the circuit 802 to the lines connected to the inputs of the arrays. Each of these lines corresponds to a pixel value. Whilst eight memories 801 are read, the two remaining memories 801 are filled with the lines which differ between the bands currently being read and the bands required immediately after.

Two arrays located on one and the same line can be regarded as forming just a single array of double horizontal size, or two individual arrays. As the case may be, the results of the additions at the end of a first array are either transmitted to the second or restored directly by the cells "M", which determine the smallest value among all the error function values for a given current block.

Equally simply, it is possible by virtue of the adders upstream of the "M" cells to add up the values of the error function for two arrays vertically overlaid to form an array of double vertical size.

It thus becomes easy to adapt the circuit of FIG. 8 to current blocks of different size: blocks of 4*8, of 4*16, of 8*8, of 16*16 pixels etc.

According to the present example embodiment, the line memories are addressable random-access memories in the sense that a pixel can be read at any of the addresses of these memories.

The addressing of the line memories is carried out by microcontroller 812. This microcontroller also manages the multiplexer 404 of the "S" cells.

According to another mode of operation of the array of FIG. 5 other than that described previously in conjunction with this figure, the pixels of two blocks are stored in parallel in the S cells. This implies that it becomes possible to switch the arrays of FIG. 8 between two groups of eight blocks of 4*8 pixels stored in parallel, independently of the bands of the search window which are introduced into these arrays. As has been seen with regard to the internal commands of the "S" cells, this switching can be effected at the level of each pixel.

The calculations relating to a group of blocks are termed a "pass" in what follows. All the pixels required for the calculations relating to the first group of blocks are inserted into the arrays during a first pass before the pixels required for the second group are inserted during a second pass.

By choosing the blocks judiciously in such a way that their search windows overlap, it is possible to reduce the pass-band required for feeding the line memories 801.

Sixteen blocks of 4*8 pixels have to be selected in the current image so as to be stored in the array. Given that the search window should have the smallest possible area, blocks forming a rectangle will be chosen. There are therefore five possibilities:

(a) One line of sixteen blocks
 (b) Two lines of eight blocks
 (c) Four lines of four blocks
 (d) Eight lines of two blocks
 (e) Sixteen lines of one block According to the present embodiment, the following restriction is used to determine the placement of the sixteen blocks in the array:

It is sought to process the right half of a series of adjacent blocks during one pass and the left half during the other pass.

The advantage of applying this rule will be seen later. There are limit cases in which it is not applicable.

The application of this rule in the present case is illustrated by FIGS. 6(*a*) to (*g*). FIGS. 6(*a*) to 6(*e*) represent the five previously defined arrangements of current blocks, whereas FIGS. 6(*f*) and 6(*g*) respectively represent the storages of these blocks in the matrix of arrays of FIG. 8. FIG. 6(*f*) relates to the arrangements of FIGS. 6(*a*), 6(*b*), 6(*c*) and 6(*e*), whilst FIG. 6(*g*) relates to the arrangement of FIG. 6(*d*).

Figure 6A:
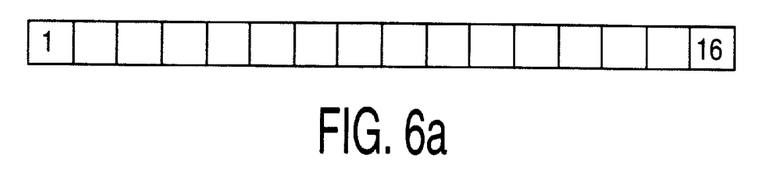
FIGS. 6(a) to 6(e) represent the arrangements of the blocks according to the present example embodiment.
Figure 6B:
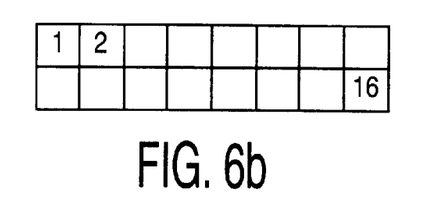
Figure 6C:
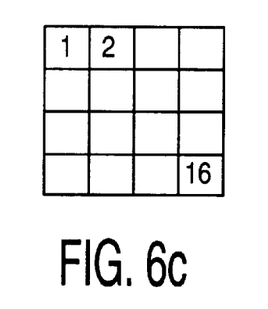
Figure 6D:
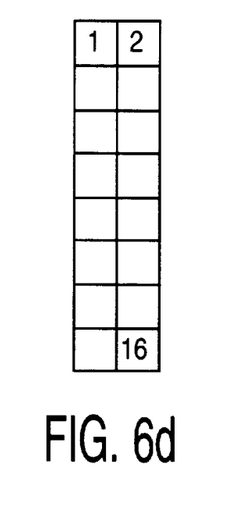
Figure 6E:
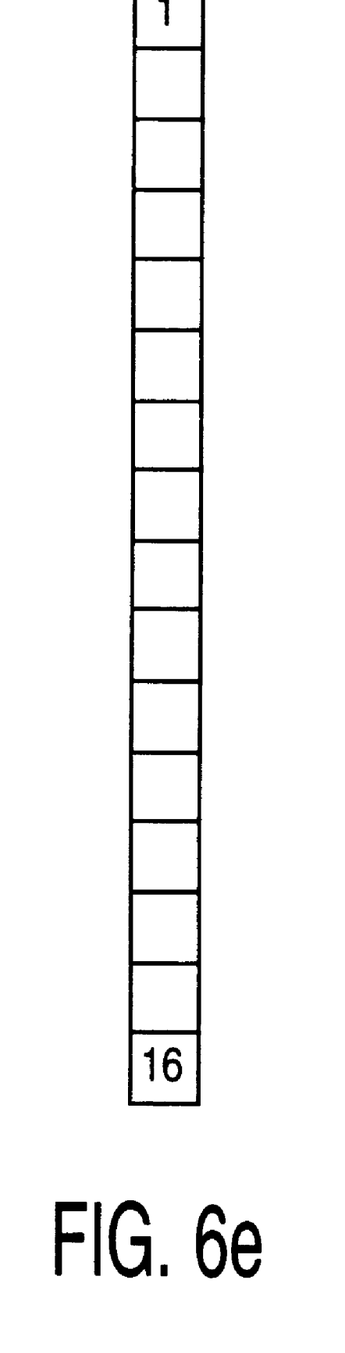
Figure 6F:
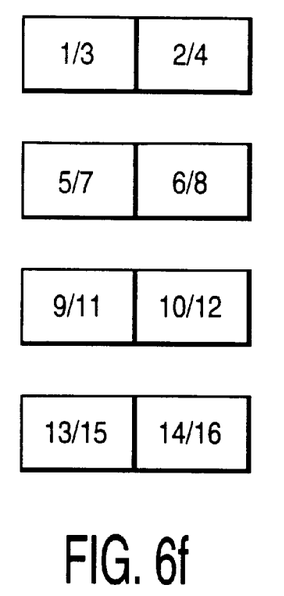
FIGS. 6(f) and 6(g) represent the storage of the blocks of FIGS. 6(a) to 6(f) in the matrix of arrays according to the example embodiment.
Figure 6G:
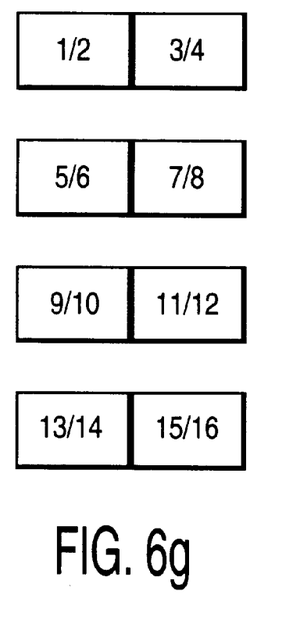

In cases (a), (b) and (c), the series of adjacent blocks are always composed of four blocks: (1/2/3/4) for example form a series of adjacent blocks, the two leftmost blocks being stored in the first line of arrays of the matrix in the buffers corresponding to the first pass, whilst the two rightmost blocks are stored in the buffers corresponding to the second pass.

It is quite evident that if the matrix were to include four arrays per line, the series of adjacent blocks would each include eight blocks.

In order that the rule prescribed above can be complied with in case (d), the case in which each line of blocks includes only two blocks, it is necessary for the two blocks of one and the same line to be processed during different passes, as illustrated in FIG. 6(*g*): blocks 1 and 2 are stored in the first array of the first line, blocks 3 and 4 in the second etc.

Figure 7:
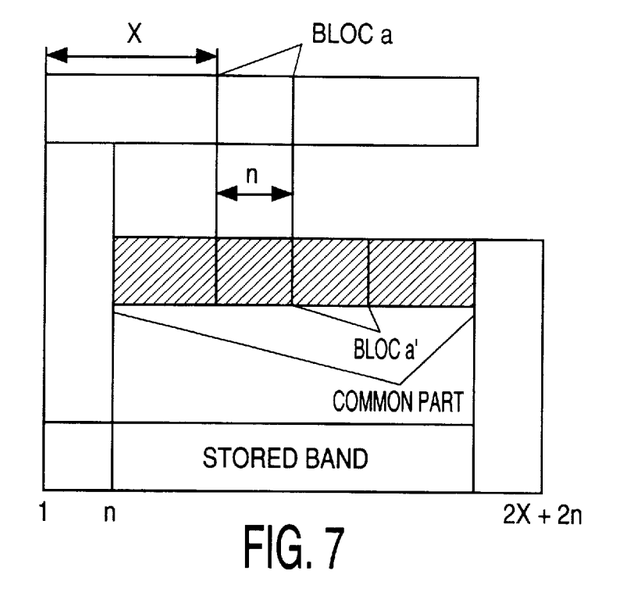
FIG. 7 represents the bands of the search window around two adjacent blocks and the resultant band.

The advantage afforded by employing this apportioning of the blocks can be explained in conjunction with FIG. 7.

As was mentioned earlier, a search window is defined by the position, referred to another image (the previous one in the present example), of the current block. In what follows it is assumed that a search window is centred on a block and that the search window possesses a horizontal margin of X pixels on either side of the block (see FIG. 1). Two bands of search windows relating to two adjacent blocks a and a' overlap over a significant part of their length. This is illustrated by FIG. 7, the shaded part of the central band being the part common to the two bands corresponding to the two blocks a and a' respectively.

So that the motion estimations relating to these two blocks can be suitably accomplished, the band stored in the line memories 801 should be the one which appears at the foot of FIG. 7. In this instance, the first and last n columns of pixels of the band will respectively serve during a single pass only and will be of no use during the other pass.

With the line memories containing the band of pixels being addressable pixel column by pixel column, the part of the band inserted into the matrix of arrays will be made to begin at different columns depending on the pass. If the calculations relating to block a of FIG. 7 are performed during the first pass, then the band will be inserted starting from column 1 during this first pass, and up to column 2X+n. Similarly, if the calculations relating to block a' are performed during the second pass, the part of the band inserted during this pass will begin only at column n and will go up to column 2X+2n.

Hence, over one pass n calculation cycles are saved as compared with inserting the complete band.

In this case, the number of calculation cycles per pass is therefore:

$$NCPP = Sx + n*Nx/2 - 1$$

where Nx represents the number of horizontally adjacent blocks. Nx is equal to 2 in the example of FIG. 7. The cases Nx=16, Nx=8 and Nx=4 are illustrated by the arrangements (a), (b) and (c) respectively of FIG. 6. In respect of FIG. 6(d), Nx is equal to 2.

When there are no adjacent blocks, this being the case of arrangement (e) of FIG. 6, this advantage cannot be exploited. Thus, the complete band will have to be inserted into the array during each pass. In this case, $$NCPP = Sn + n*Nx - 1 \text{ with } Nx = 1$$

The number of passes to be performed is equal to double the number of bands needed for vertical coverage of the search window required for all the blocks, given that two blocks are stored per array.

$$NPAS = 2*(Sy + m*(Ny-1))$$

where Sy represents the number of positions of a block along a vertical of the search window, where m represents the number of lines per block and where Ny represents the number of vertically adjacent blocks.

The number of calculation cycles in each of the 5 cases mentioned is therefore:

(a),(b),(c),(d): $NCYCLE = 2*(Sx + n*Nx/2 - 1)*(Sy + m*(Ny-1))$ (e): $NCYCLE = 2*(Sx + n - 1)*(Sy + m*(Ny-1))$

Carrying out the numerical application in the five cases cited above, with blocks of 4 lines and 8 columns and putting Sx=kSy, where k is the shape factor of the search window, we obtain the numbers of cycles to process the set of 16 blocks:

(a) $NCYCLE = 2*(kSy+63)*Sy = 2[kSy^2 + 63Sy]$ (b) $NCYCLE = 2*(kSy+31)*(Sy+4) = 2[kSy^2 + (4k+31)Sy + 124]$ (c) $NCYCLE = 2*(kSy+15)*(Sy+12) = 2[kSy^2 + (12k+15)Sy + 180]$ (d) $NCYCLE = 2*(kSy+7)*(Sy+28) = 2[kSy^2 + (28k+7)Sy + 196]$ (e) $NCYCLE = 2*(kSy+7)*(Sy+60) = 2[kSy^2 + (60k+7)Sy + 420]$

The factor 2 as well as the squared term are not of use in comparing the number of calculation cycles as a function of Sy and of k. The numbers of calculation cycles may therefore be represented in a relative manner by straight lines.

Figure 9:
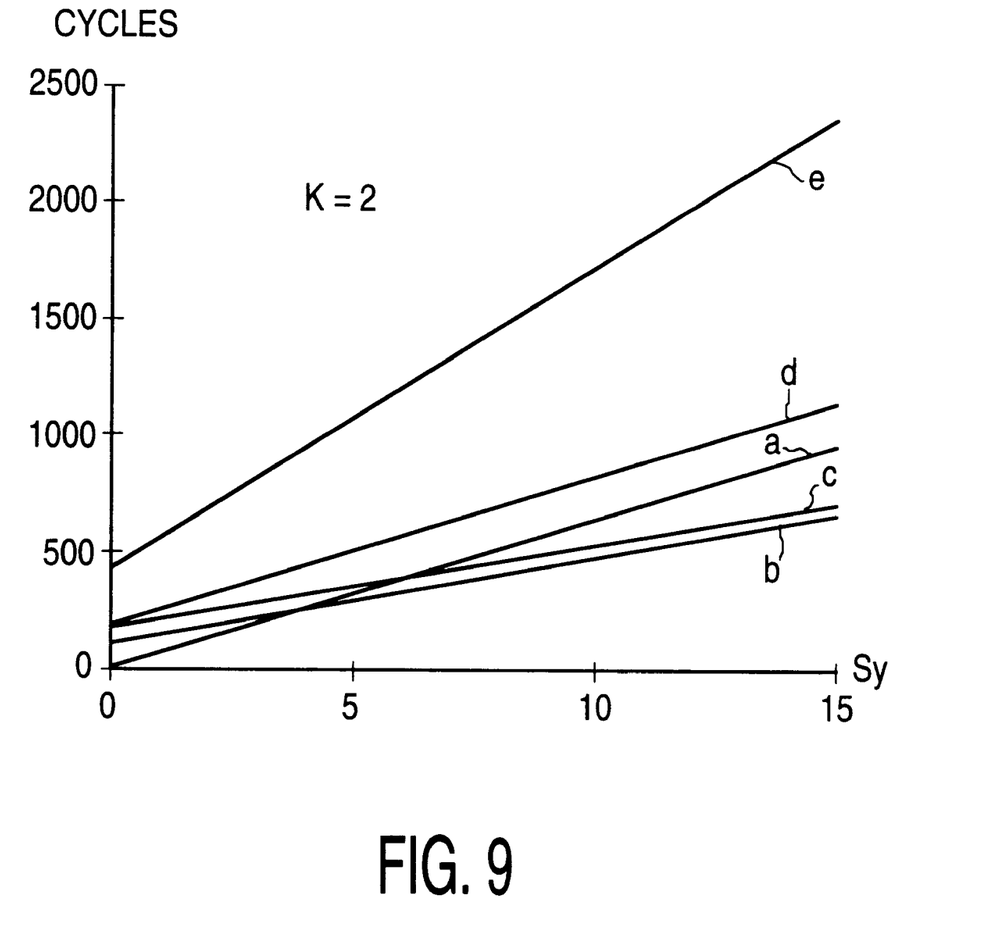
FIG. 9 represents straight lines indicating the differences of calculation cycles as a function of the arrangement of the blocks.

FIG. 9 illustrates the corresponding curves for k=2.

For commonly employed shape factors lying between 1 and 4, cases b and c are of greatest interest. Solution c will be better than solution b if (16-8k)Sy>56.

Stated otherwise, for search windows approximating to a square, solution c will be chosen, that is to say a set of blocks also having a square arrangement. For a search window which is wider than it is high with a shape factor of between 2 and 4, solution b will be chosen.

The shape factors which make the other solutions of interest are either greater than 8 (for solution a), or less than 0.5 (for solution d).

I claim:

1. Device for estimation of motion of pixel blocks in search windows, comprising:

a matrix array of means for calculating error function values;

a matrix array of storage elements for storing a plurality of groups of adjacent pixel blocks and connected to said array of means for calculating error function values;

switching means for successively selecting each of said plurality of groups of pixel blocks and for providing pixels of said selected group from said matrix array of storage elements to said matrix array of means for calculating error function values during a calculation pass;

a memory for storing a slice of a composite search window encompassing search windows corresponding to said plurality of groups of adjacent pixel blocks, an output of said memory being connected to said matrix array of means for calculating error function values, wherein said slice is updated in response to error function value calculations performed for said slice; and means for accessing said memory to provide a partial section of said slice to said matrix array for calculating error functions, said partial section corresponding to a selected group of adjacent pixel blocks wherein each array of said means for calculating error function values carries out calculations for one slice for one pixel block in one calculation pass.

2. Device according to claim 1, wherein said composite search window encompasses a search window for each pixel block of said groups of pixel blocks, taken one by one.

3. Device according to claim 1, wherein said device includes a lines of b matrix arrays connected in series, and said a lines are connected in parallel to said memory.

4. Method for estimation of motion of pixel blocks in search windows in a device comprising a matrix array of storage elements for storing groups of adjacent pixel blocks, switching means for providing pixels of one of said groups to a matrix array of error function value calculation means, and a memory for storing a slice of a composite search window encompassing search windows corresponding to said groups, said method comprising the steps of:

selecting a rectangle of x*a*b adjacent pixel blocks from a current image;

splitting said rectangle into x groups of a*b adjacent pixel blocks;

storing said x groups of blocks in storage elements;

loading into a memory a slice of said composite search window;

successively selecting each one of said groups and providing, through switching means, pixels from said selected group to said error function value calculation means; and calculating in one pass, using said error function value calculation means, error function values for said selected group and for a section of said slice within said composite search window, wherein said section corresponds to a selected group.

5. Method according to claim 4, wherein said x groups are horizontally adjacent rectangles of a*b blocks, and said slice is a horizontal slice.

6. Method according to claim 4, wherein the shape factor of said rectangle of a*b blocks is close to the shape factor of a single block.

* * * * *